Figure 1:
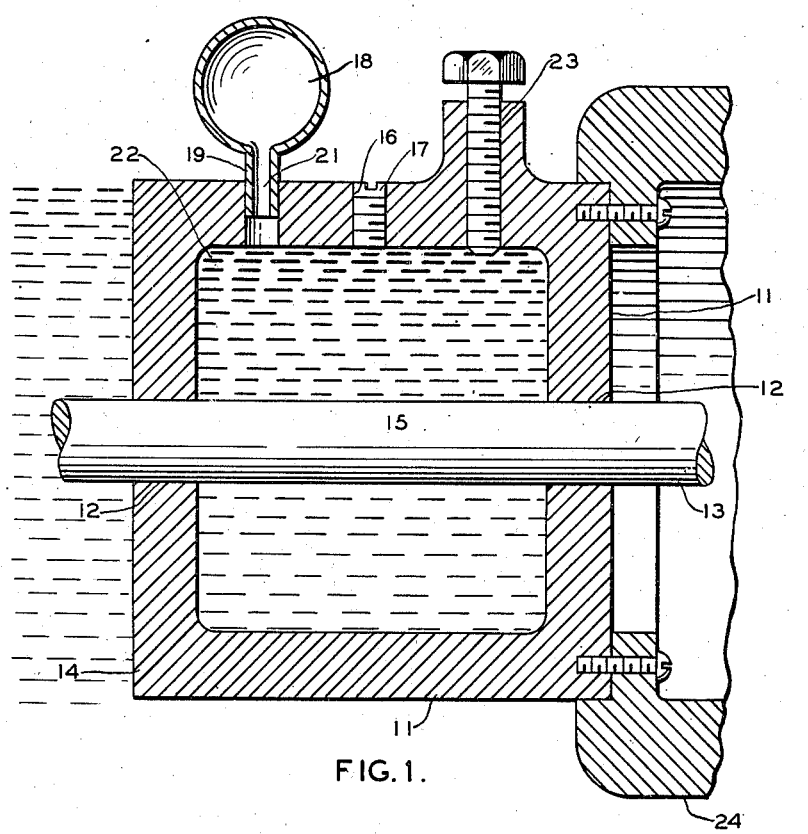

March 1, 1949.    G. H. ROBISON    2,462,901
MERCURY STUFFING BOX BEARING UNIT
Filed July 5, 1945

*INVENTOR.*
GERSON ROBISON
BY
William D. Hall.
ATTORNEY

Patented Mar. 1, 1949

2,462,901

UNITED STATES PATENT OFFICE 2,462,901

MERCURY STUFFING-BOX BEARING UNIT

Gerson H. Robison, Asbury Park, N. J.

Application July 5, 1945, Serial No. 603,395

1 Claim. (Cl. 286—9)

(Granted under the act of March 3, 1883, as amended April 30, 1928; 370 O. G. 757)

The invention described herein may be manufactured and used by or for the Government for governmental purposes, without the payment to me of any royalty thereon.

This invention refers to bearings and gaskets, and more particularly, to those requiring stuffing boxes to prevent leakage from liquids exerting pressure thereon. The stuffing boxes around shafts, used for preventing water from an external source leaking past are usually provided with conventional composition packing or gaskets. The disadvantage of this type is in the fact that it requires considerable gasket pressure to keep the bearings tight and prevent the ingress of water. This pressure induces friction which, in turn, reduces the efficiency of the mechanism on which it is used.

In the present invention, it is an object to provide a new and improved stuffing-box bearing unit that will avoid one or more of the disadvantages and limitations of the prior art.

An additional object of this invention is to provide a stuffing-box unit that will have a low frictional co-efficient and small maintenance requirements.

A further object of the invention is to provide a stuffing-box unit that will eliminate conventional types of packing in its use.

In a particular construction, a stuffing-box bearing unit consists of a housing having an internal chamber with a hole through a wall thereof for the passage of a shaft to be placed therein. Convex-meniscal fluid fills the chamber and directly contacts the surface of the shaft with sufficient pressure and repulsion to prevent the entrance of water into the chamber; but not sufficient to cause the fluid to be forced out of the housing. It can be appreciated that the construction can include a metallic, nonwetting liquid, such as mercury, and means for adjusting the pressure of this liquid in the stuffing-box, to counteract the external pressure of the outside liquid acting on the stuffing-box.

For a better understanding of the present invention, together with other and further objects thereof, reference is had to the following description taken in connection with the accompanying drawings, which are used to illustrate a particular form of the invention, and its scope will be pointed out in the appended claims.

Figure 2:
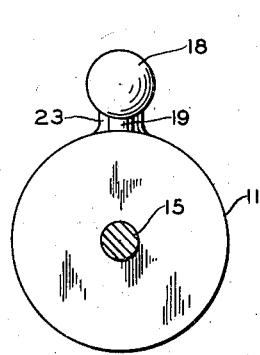

Referring to the drawing:

Figure 1 is a view in elevation partly in section of a stuffing-box bearing, embodying this invention, and Figure 2 is an end view of the bearing indicated in Fig. 1.

Figure 3:
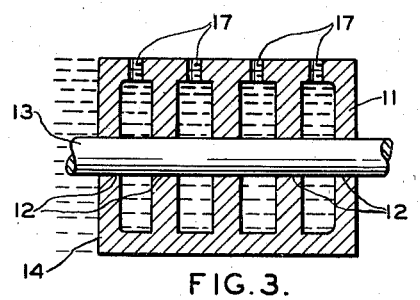

Figure 3 indicates a modified form having a diagrammatic arrangement of mercury chambers in plural stages where higher hydrostatic pressures are employed.

Similar reference characters refer to similar parts throughout the drawing.

In the structure shown in the drawing, 11 represents a stuffing-box bearing housing suitably provided with aligned holes 12 in its walls, through which a shaft 13 having proper clearance projects. This bearing housing can be attached in any conventional manner to a machine 24. One external side 14 is under hydraulic pressure, as indicated. The interior of the housing consists of a chamber 15 filled with a fluid or liquid having a convex-meniscus reaction when contacting the housing and shaft surfaces, such as mercury. The shaft must be of material not chemically affected by the mercury. The fluid or liquid is inserted through an orifice 16 that is closed by a conventional screw-plug 17. The use of mercury is preferable also because of its great surface tension, and repellant action to water. A safety arrangement is provided in the walls of the housing to take-up any excessive pressure, due to expansion of the mercury, arising in the chamber 15. This safety device consists of a suitable air chamber 18 under pressure with its neck 19 leading into a passage 21 in the wall of the housing. The air in this chamber is under sufficient tension to take-up any excess pressures endangering the housing 11, arising from the expansion of the mercury 22 in the chamber; but not interfering with its operative value to resist the water. Such pressure may be due to rises in temperature. The pressure that the mercury normally exerts on the shaft and around the hole 12, to withstand any external hydraulic pressure brought to bear on the side 14, depends on its static head within the chamber. To avoid too large a chamber and housing for the larger sizes of bearings, such pressure is compensated for by providing a stud bolt 23 which, when pushed into the mercury 22, produces an internal hydrostatic head of sufficient pressure by the mercury in the chamber 15 to offset that existing externally, exerted by the water. In other words, for ordinary pressures where the depth of the mercury in the chamber around the shaft is sufficient to keep back the hydraulic pressure exerted exteriorly, no such pressure means is needed; but for higher pressures, as in the case of a bearing deep in a well, sufficient pressure resistance by the mercury has to be provided to keep the water out. In such cases, the bolt 23, with its pressure mercury, is utilized. The shaft 13 operates within the stuffing-box bearing housing in an ordinary manner. It does not necessarily have to rotate, but such is considered to be generally the case. The mercury, itself, acts as a frictionless bearing for the shaft 13, and as a conductor and remover of heat, to keep its temperature normal. It also has a brushing effect on the shaft tending to keep it clean and preventing corrosion.

In the operation of the invention, the convex-meniscal qualities of the mercury have a non-wetting action on the surrounding metal parts, including the shaft, and have a repellant action to water. The shaft must be of necessity appreciably non-chemical-combining with the fluid or mercury employed. The mercury under its head of pressure and convex-meniscus effect exerts resistance to the water under its hydrostatic force, to keep it out. Should the external hydrostatic force increase, the pressure exerted by the mercury against the shaft 13 and around the hole 12 and inner surface of the bearing has to be made sufficient to prevent water leakage into the chamber 15, through or by the mercury and, at the same time, not enough to cause the latter to be forced out of housing of the bearing. A clearance around the holes 12 about the shaft 13, of about .001, has been found satisfactory to retain the mercury within the chamber. The action of the mercury against the water and water pressure is that of a repellant due to its meniscal qualities and high surface tension. Its mobility affords adjustability to all general conditions, and capacity to avoid any mechanical binding due to misalignment or variations in structure, which, at the same time, acts effectively. The mercury pressure can be increased by screwing bolt 23 into the mercury. The mercury makes direct contact with the periphery of the shaft and leaves it free and without the need for using sleeves and gaskets.

While there has been described what is at present considered to be a preferred embodiment of this invention, it will be obvious to those skilled in the art that various changes and further modifications may be made therein without departing from the spirit of the invention or the principles thereof. It is, therefore, intended in the appended claims to cover all such changes and modifications as fall within the true spirit and scope of the invention.

What is claimed is:

A stuffing-box unit comprising, a housing having a sealing chamber therein, a mercurial liquid contained in said chamber having meniscal qualities and nonchemical reaction with regard to the material composing said housing and repellent to water, said chamber having a circular hole in its wall for a shaft having a clearance of about .001 inch to pass therethrough, a pneumatic chamber connected with said sealing chamber to permit resilient adjustment to the expansion and contraction of said liquid in said sealing chamber, and a means attached to said housing and adjustably projectable into the liquid for its displacement and pressure adjustment.

GERSON H. ROBISON.

REFERENCES CITED

The following references are of record in the file of this patent:

UNITED STATES PATENTS

| Number | Name | Date |
|---|---|---|
| 943,169 | Strance et al. | Dec. 14, 1909 |
| 1,641,377 | Eisenhauer | Sept. 6, 1927 |
| 2,064,703 | Van De Graaff | Dec. 15, 1936 |
| 2,215,686 | Buchet | Sept. 24, 1940 |
| 2,262,687 | Little | Nov. 11, 1941 |
| 2,291,248 | Myers | July 28, 1942 |

FOREIGN PATENTS

| Number | Country | Date |
|---|---|---|
| 252,407 | Great Britain | 1926 |